June 7, 1938.  W. B. HAUSMAN  2,120,096
KNIFE SHARPENING MACHINE
Filed April 9, 1936  3 Sheets-Sheet 1
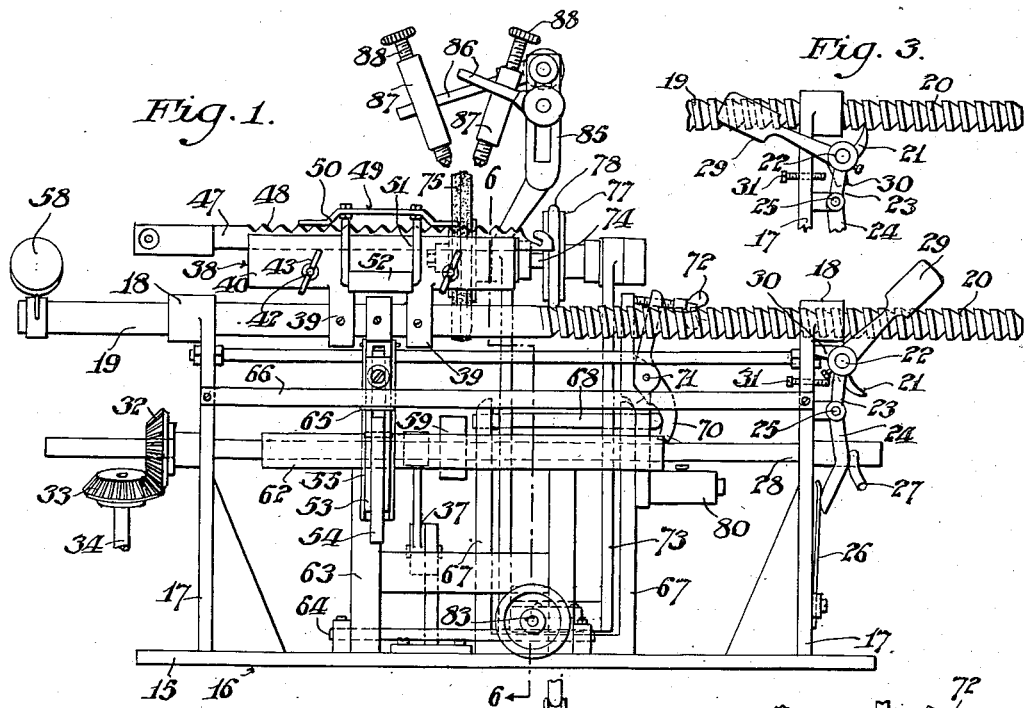
Inventor:
Ward B. Hausman,
By W. B. Williamson
Attorney.

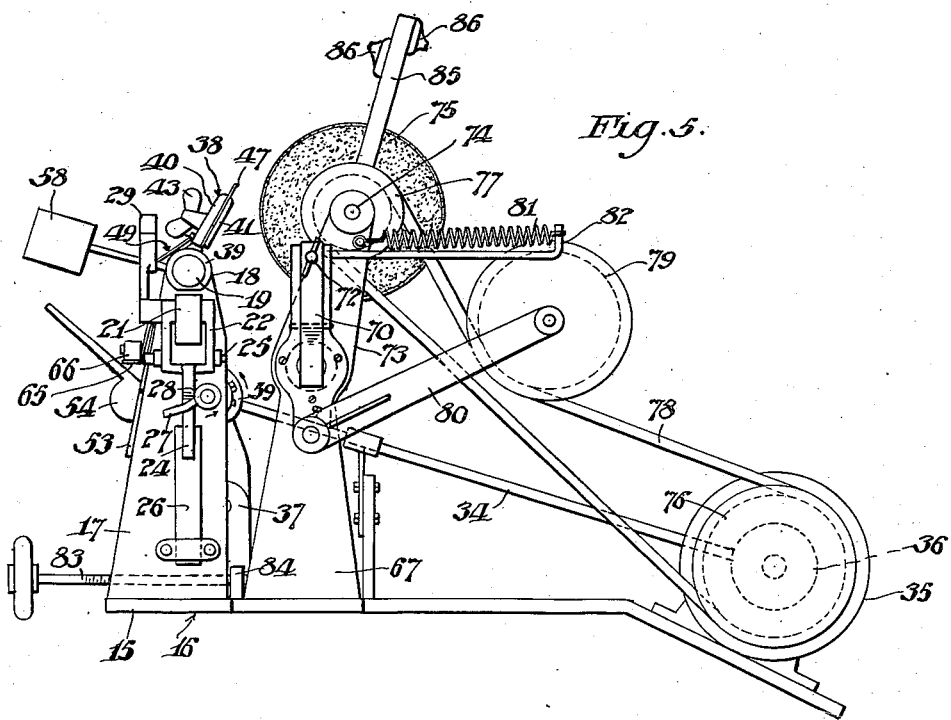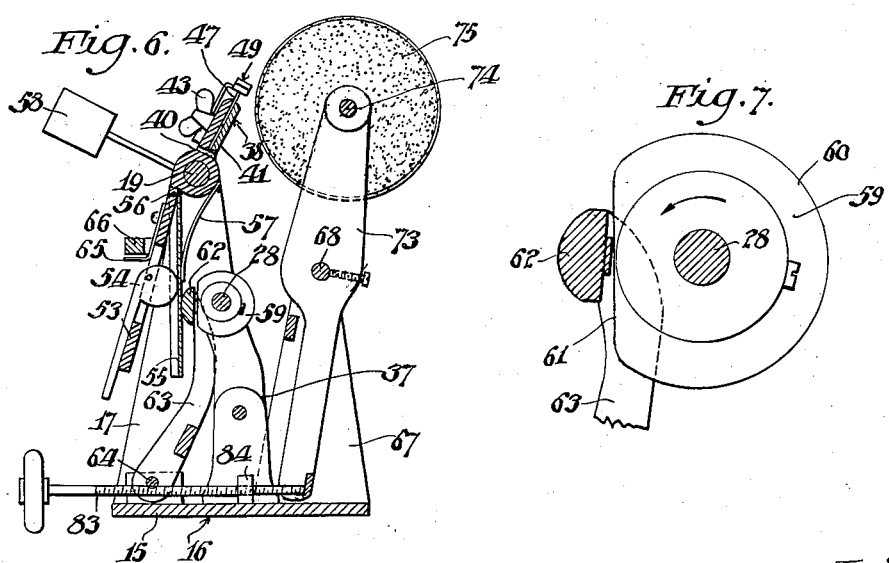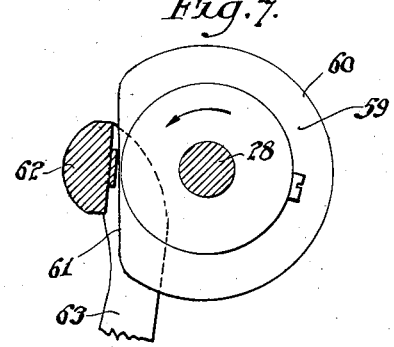

June 7, 1938.　　　W. B. HAUSMAN　　　2,120,096
KNIFE SHARPENING MACHINE
Filed April 9, 1936　　　3 Sheets-Sheet 3
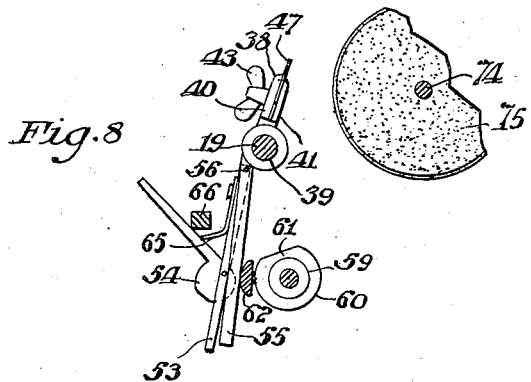
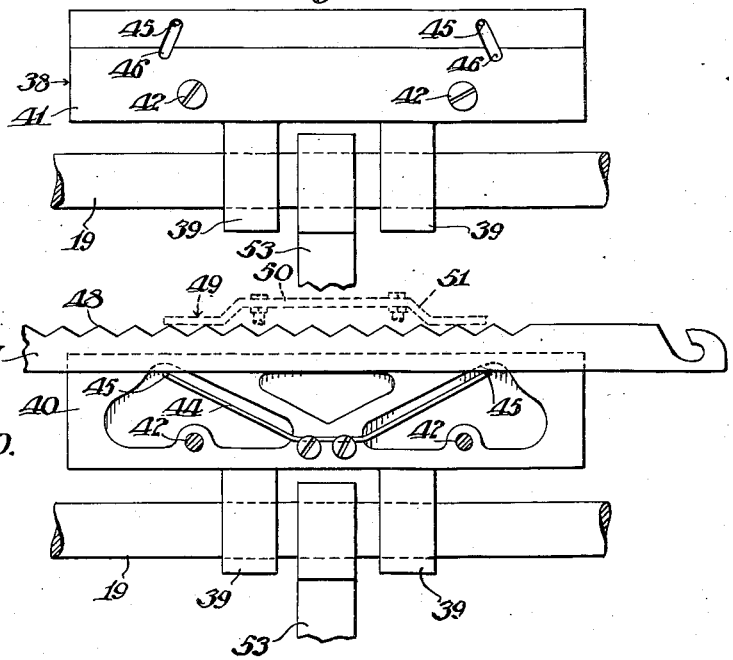
Inventor:
Ward B. Hausman,
By W. W. Williamson
Attorney.

Patented June 7, 1938

2,120,096

UNITED STATES PATENT OFFICE 2,120,096

KNIFE SHARPENING MACHINE

Ward B. Hausman, Philadelphia, Pa.

Application April 9, 1936, Serial No. 73,432

5 Claims. (Cl. 51—72)

My invention relates to a new and useful knife sharpening machine and more particularly to a machine for grinding serrated knives such as used in gangs or banks in bread slicing machine where entire loaves of bread are sliced at one operation.

An object of the invention is to produce a machine of this character which is semi-automatic in operation and capable of accomplishing accurate work.

Another object of the invention is to provide means for positively grinding a certain complete area of a serrated knife, for example, the material bordering a V-shaped notch, each time a cut or grinding operation is made.

Another object of the invention is to provide a clamp for a knife having spring means to urge the knife outward until the adjustment is completed.

Another object of the invention is to provide a gauge on the clamp which will set the cutting edge of the knife properly relative to the grinding wheel regardless of the width of such knife.

Another object of the invention is to provide mechanism for moving the clamp and component parts endwise intermittently or step by step a distance equal to the spacing of the serrations whereby one side of two adjacent serrations will be ground simultaneously.

Another object of the invention is to make a rack bar of unique construction for use in connection with the intermittent clamp moving mechanism.

Another object of the invention is to construct the ratchet mechanism in a manner that it may be thrown out of operation and the disengaging of the ratchet from the rack bar will move the actuating lever out of the path of travel of the knocker pin.

Another object of the invention is to mount the grinding wheel on a frame capable of forward and backward as well as lateral adjustment to take up for wear on the grinding wheel and setting said wheel relative to the serrations of the knife.

A further object of this invention is to provide means for dressing the grinding wheel which will be ready for use at all times and which can be adjusted for wear.

A still further object of the present invention is to construct a compact device of the kind mentioned which is capable of operation by persons other than highly skilled artisans.

With the above and other objects in view this invention consists of the details of construction and combination of elements hereinafter set forth and then designated by the claims.

In order that those skilled in the art to which this invention belongs I will describe one form of construction in detail, in which:—

Fig. 1 is a front elevation of the knife sharpening machine constructed in accordance with my invention, the parts being shown in their at rest positions.

Fig. 2 is a top plan view thereof.

Fig. 3 is a fragmentary view of the rack bar and ratchet with the latter in its operative position.

Fig. 4 is a fragmentary detail view of the laterally adjusting means for the grinding wheel frame.

Fig. 5 is an end view of the machine.

Fig. 6 is a section on the line 6—6 of Fig. 1 without the driving means.

Fig. 7 is an enlarged detail of the cam and oscillating bar.

Fig. 8 is a fragmentary detail view of the knife clamp, the oscillating bar to reciprocate said clamp, the operating cam and the grinding wheel, illustrating their relations when in operative positions.

Fig. 9 is an enlarged rear view of the knife clamp, and

Fig. 10 is also a rear view with the back plate or jaw removed and showing how a knife is set therein and positioned by the gauge which is illustrated in dotted lines.

In carrying out my invention as herein embodied, 15 represents a base plate of the main frame 16 to be mounted on a table, bench or other suitable supporting means, not shown. At both ends are standards 17 carrying bearings 18 in which the rack bar 19 is slidably and rotatably mounted.

This rack bar 19 has a rack 20 only on one end produced in spiral or thread formation. I have discovered that when a rack is made on one side of a bar, the latter will bow or become misshaped whereas by forming the cuts all around the bar it remains straight and true. Another advantage of the present construction of the rack is that whenever it becomes worn along one line it may be turned slightly and a new surface is presented.

The rack bar 19 is moved longitudinally step by step or intermittently through the medium of a ratchet or pawl 21 mounted on an axle 22 journalled in a yoke 23 at the upper end of the ratchet operating lever 24 pivoted intermediate its ends, as at 25. The lower end of said lever 24 is urged outward, preferably by a spring 26, and is forced against the action of said spring by a knocker pin 27 on the revolving shaft 28. On a protruding end of the axle is a weight 29 which, when swung to one side of the vertical center of the axle 22, positions the pawl 21 in operative relation to the rack 20, Fig. 3, and, when swung over to the other side, holds said pawl out of engagement with said rack, Fig. 1. In order to move the operating lever 24 out of the path of travel of the knocker pin 27 when the pawl is disengaged from the rack, a lug 30 is provided and preferably formed on the hub of said pawl so as to co-act with the machine frame, for example, one of the standards 17, and force the upper end of the pawl operating lever 24 outward whereby the lower end of said lever is moved inward against the action of the spring 26. The inward throw of the pawl is limited by an adjusting screw 31 threaded through the machine frame, or one of its standards 17, and positioned to be engaged by the upper part of the pawl operating lever 24.

The shaft 28 is revolved in any suitable manner and for purposes of illustration it is shown as having a bevel gear 32 thereon, meshing with a bevel gear 33 on a countershaft 34 driven from a motor 35 through reduction gears in the gear box 36. This shaft 28 may be additionally supported intermediate its ends by an adjustable standard 37.

A knife clamp 38 is fixed to the rack bar 19 by ears 39 formed with the front jaw 40 of said clamp, and a rear jaw 41 is mounted in place by adjustable fastening means herein illustrated as including screws 42 and wing nuts 43. To the inner face of one of the jaws, as the front jaw 40, is fastened a resilient knife lifter or pusher 44, Fig. 10, preferably formed from a section of spring wire fashioned into practically V-shape with its ends bent at right angles to provide knife rests 45 of sufficient length to accommodate any ordinary opening movement of the jaws. As said rests extend across the opening or space between the jaws a way must be provided to take care of said rests wherefore elongated oblique apertures 46 are produced in the other jaw, as the rear jaw 41, through or into which said rests project, Fig. 9.

With the jaws of the clamp 38 open a knife 47, having a serrated cutting edge 48, is inserted and forced inward against the action of the resilient lifter 44 until said knife is properly positioned at which time the jaws are clamped on the knife by the wing nuts 43. In order to set the serrated cutting edge of the knife in the proper position regardless of the width or depth of said knife, I provide a gauge 49 consisting of a plate 50 attached to the ends of a frame 51, preferably U-shaped, hinged or swingingly connected at 52 to the clamp 38 and more particularly to the front jaw thereof. This gauge has a fixed relation to the clamp so that by placing a knife in said clamp and then swinging the gauge over above the cutting edge the latter will be lifted or pushed against the gauge plate by the lifter 44, after which the clamp may be closed on the knife.

In addition to the clamp being moved longitudinally with the rack bar, said clamp is to be reciprocated. To accomplish this last movement a rocker arm 53 is fixed to the rack bar 19 and has a lever cam 54 pivoted within an aperture in the rocker arm and co-acting with a shoe 55 pivoted to the upper portion of said rocker arm as at 56. The free end of the shoe 55 is urged toward said rocker arm 53 by a leaf spring 57 fixed to the hub of the rocker arm and bearing against the shoe, Fig. 6, and at the same time the rocker arm is urged inward by the weight 58 connected to the rack bar 19 and so rotating the latter in one direction.

To rotate said rack bar in the opposite direction and thus reciprocate the knife clamp and component parts I provide a cam wheel 59 having an eccentric surface 60 and a flat surface 61 so there will be a gradual rise and a sharp drop. This cam is mounted on the shaft 28 and co-acts with a bar 62 carried by the brackets 63 pivoted at 64 to suitable parts of the machine frame and the face of said bar opposite that acted upon by the cam is engaged by the shoe 55 of the clamp reciprocating mechanism. The knocker pin 27 and the flat surface 61 of the cam 59 are so located relative to each other, or timed, that while said flat cam surface is contiguous the bar 62, the knocker pin 27 engages and actuates the lever 24 of the pawl 21.

With the parts as in Fig. 5 the clamp 38 has been retracted and a knife can be removed from or placed in said clamp as the case may be. The handle of the lever cam 54 is then swung down as in Fig. 6. This will positively force the shoe 55 against the bar 62 and swing the rocker arm 53 outward thus rotating the rack bar and moving the upper edge of the clamp 38 inward. Then as the cam wheel 59 revolves it will gradually move the shoe 55, the rocker arm 53 and component parts outward and the upper edge of the clamp 38 farther inward. During this step of the operation, the drag foot 65 on the rocker arm 53 will be forced against the drag bar 66 and prevent accidental longitudinal movement of the rocker arm 53, rack bar 19, a clamp 38 and component parts. As soon as the flat surface 61 of the cam 59 reaches the bar 62, the latter will move inward along with rocker arm 53, due to the action of the weight 58. This will retract the clamp 38 and release the drag foot 65 whereupon the pawl 21 will be actuated to move the rack bar 19 longitudinally one step.

Another pair of standards 67 are provided, which for purpose of clarity will be termed supplemental standards, and in these is rotatably and slidably mounted a shaft 68. This shaft is urged longitudinally in one direction by a spring 69, Fig. 4, socketed in one of the supplemental standards and engaging a collar on said shaft. The shaft 68 is moved longitudinally in the opposite direction by a lever 70 pivoted intermediate its ends at 71 with one end in contact with the shaft and the other end having a screw 72 threaded through it and impinging on a portion of one of the supplementary standards 67 whereby the shaft 68 may be adjusted any desired small amount.

On the shaft 68 is fixed a swinging frame 73 having bearings at the upper end for the grinding wheel shaft 74 carrying a grinding wheel 75 with its perimeter fashioned to grind V-shaped serrations on the knife. The grinding wheel shaft 74 is driven by the motor 35 through a pulley 76 on the motor shaft a pulley 77 on the grinding wheel shaft and a belt 78 running over said pulleys. The belt is retained in a taut condition by the weight of a tightening pulley 79 journalled on a trunnion carried by the free end of the arm 80 which has its inner end pivoted on one of the supplemental standards 67.

The upper end of the swinging frame 73 is urging rearwardly or outwardly by a spring 81 having one end anchored to a bracket 82 mounted on the machine frame, as one of the supplemental standards 67, and the other end attached to a suitable part of said swinging frame. The lower end of the swinging frame 73 is therefore urged forwardly or inwardly and is engaged by a screw 83 threaded through a boss 84 on the frame. By screwing the screw 83 inward the grinding wheel 75 will be moved toward the knife in the clamp 38 so that wear on said grinding wheel may be compensated for or a deeper cut made in the knife and by backing out the screw 83 the spring 81 will draw the grinding wheel away from the knife and relieve the pressure or make a shallower cut. This will also permit the installation of a new or larger diameter grinding wheel.

From this it will be apparent that the provision of the swinging frame makes it possible to adjust the grinding wheel lateral relative to the knife serrations, if the knife is not accurately positioned in the clamp, and also to and fro if the knife is not properly meeting said grinding wheel.

In order to occasionally dress the perimeter of the grinding wheel to maintain the proper bevels thereon, I provide a bracket 85 attached to the swinging frame 73 with guide arms 86 adjustably mounted thereon to be set at angles corresponding to the inclination of the grinding wheel bevels. On these guide arms are slidably mounted holders 87 in which the dressing tools 88 are screw threaded. When the arms are properly adjusted and the working ends of the tools projected from their holders sufficiently to contact the perimeter of the grinding wheel, said holders may be slid along their respective guide arms and both bevels of the grinding wheel will be dressed or cleaned and reshaped.

The operation is as follows:—

To set the machine, the pawl or ratchet 21 is thrown out of engagement with the rack bar 19 which will move the ratchet operating lever 24 out of the path of travel of the knocker pin 27. This will permit the operator to manually slide the rack bar longitudinally, toward the left in Fig. 1, until said rack bar is in a starting position. The lever cam 54 is also released by throwing its handle upward to cause the rocker arm 53 to approach the shoe 55 which will retract the knife clamp 38 due to the action of the weight 58. Next said clamp is opened and a knife inserted so that the serrations at the forward end of said knife are properly positioned relative to the grinding wheel 75 or approximately so. The gauge 49 is swung over the cutting edge of the knife and the resilient pusher 44 will force said knife against the gauge. This brings the cutting edge to a predetermined location for engaging the grinding wheel when the knife clamp is reciprocated regardless of the width of the knife. The clamp is now closed or tightened on the knife and the gauge swung back away from the knife.

Upon the knife being fastened in the clamp, the ratchet pawl 21 is placed in operative position as shown in Fig. 3, and the handle of the lever cam 54 is turned down as in Fig. 6. The revolving of the shaft 28 will cause the bar 62 to be quickly forced outwardly a distance sufficient to cause the knife to engage the grinding wheel and then gradually add pressure on the knife to produce the desired grinding action and cutting effect on the serrations of said knife and finally permit the bar 62 to quickly return for retracting the knife from the grinding wheel. As the bar 62 returns, the knocker pin 27 will actuate the ratchet operating lever 24 and slide the rack bar a distance equal to the spacing of the serrations on the knife so when the knife is again moved toward the grinding wheel a different surface will be ground. If the serrations are improperly engaging the grinding wheel, the screw 72, Fig. 4, is moved in or out thereby adjusting the grinding wheel laterally until proper alignment is obtained and if the grinding cut is not deep enough or is deeper than desired, the screw 83 is screwed in the proper direction to adjust the grinding wheel relative to the work by the to and fro movement of the swinging frame 73.

After the parts are properly adjusted the machine continues to move the rack bar longitudinally step by step and intermittently reciprocate the same so that all of the serrations will be ground to a sharp cutting edge. Particular attention is called to the fact that each time the knife engages the grinding wheel, one side of two adjacent serrations is ground.

Of course I do not wish to be limited to the exact details of construction herein shown and described as these may be varied within the scope of the appended claims without departing from the spirit of my invention.

Having thus described my invention what I claim as new and useful is:—

1. In combination, a machine frame including a pair of supplementary standards, a shaft rotatably and slidably mounted on said supplementary standards, a grinding wheel supporting frame fixed to said shaft, means coacting with the grinding wheel supporting frame to oscillate the latter, means to urge said shaft longitudinally in one direction, means to move said shaft in the opposite direction whereby the grinding wheel supporting frame can be adjusted laterally, a grinding wheel shaft journalled in said grinding wheel supporting frame, means to drive said grinding wheel shaft, a grinding wheel mounted on the last named shaft and having a V-shaped perimeter, a knife holding means adjacent the grinding wheel, means to intermittently move said knife holding means crosswise of the grinding wheel, and means to reciprocate said knife holding means.

2. In a knife sharpening machine, a machine frame including a pair of primary standards and a pair of supplementary standards to the rear of said primary standards, a grinding wheel supporting frame mounted on the supplementary standards and capable of lateral and to and fro adjustments, a grinding wheel on a shaft journalled in the grinding wheel supporting frame, a rack bar slidably and rotatably mounted on the primary standards, a knife clamp fixed to said rack bar adjacent the grinding wheel, a rocker arm fixed to said rack bar, means to move said rocker arm outward, a weight on the rack bar whereby the rocker arm will be moved inward to impart a reciprocatory motion to the knife clamp, and a ratchet pawl to move the rack bar and the clamp endwise.

3. In a knife sharpening machine, a machine frame, a grinding wheel mounted on said frame, a rack bar slidably and rotatably mounted on said frame, a knife clamp fixed to the rack bar adjacent the grinding wheel and movable with said rack bar, a rocker arm also fixed to and movable with the rack bar, a shoe pivoted at its upper end to said rocker arm, means to move said shoe and rocker arm apart for swinging the clamp inward, means to urge the free end of the shoe toward the rocker arm, a weight connected with the rack bar to rotate the latter in one direction and thereby urge the rocker arm toward the shoe and both said rocker arm and shoe inward, a pivoted bar against which the shoe rests and of a sufficient length to accommodate the lateral travel of the shoe, a cam shaft journalled on the machine frame, a cam having an eccentric surface and a flat surface co-operating with the pivoted bar to transmit a reciprocatory motion to the knife clamp, said motion including a quick limited inward movement and a slow further inward movement and a quick return movement, a ratchet pawl co-acting with the rack bar to intermittently slide said rack bar longitudinally, an operating lever for said pawl, and a knocker pin on the cam shaft to engage said lever and actuate the pawl while the flat of the cam is in engagement with its co-acting bar.

4. The structure in claim 3, in combination with a drag foot carried by the rocker arm, and a drag bar with which said foot co-acts to prevent accidental longitudinal movement of the rack bar and component parts.

5. In a knife sharpening machine, a machine frame, a grinding wheel mounted on said frame, a rack bar slidably and rotatably mounted on said frame and having a spiral rack on one end, a cam shaft journalled on said frame, a cam fixed to the cam shaft, a bar having legs pivoted to the frame, said bar co-acting with said cam and moved in one direction by the latter, means fixed to the rack bar and co-acting with the cam actuated bar to rotate the rack bar in one direction, a weight attached to said rack bar for rotating the rack bar in the opposite direction, a ratchet lever pivoted intermediate its ends on the machine frame, means to urge the lower end outward, means adjustably mounted on the machine frame to limit the inward movement of the upper end of said ratchet lever, a ratchet pawl pivoted to said upper end of the lever and adapted to be moved into or out of engagement with the rack, a lug on said pawl to contact the machine frame and hold the upper end of the lever outward and the lower end thereof inward, a weight to maintain the pawl in its operative or inoperative positions, a knocker pin on the cam shaft to actuate the ratchet lever at regular intervals for intermittently moving the rack bar, longitudinally, and a knife clamp on the rack bar adjacent the grinding wheel to be reciprocated by the rotations of the rack bar and moved crosswise of the grinding wheel by the longitudinal movements of said rack bar.

WARD B. HAUSMAN.